United States Patent
Conn et al.

(10) Patent No.: US 7,526,499 B2
(45) Date of Patent: Apr. 28, 2009

(54) DEFINING AND GENERATING A VIEWTYPE FOR A BASE MODEL

(75) Inventors: Sharon T. Conn, Scottsdale, AZ (US); Jean-Jacques Paul Daudenarde, San Jose, CA (US); Amy Marie Silberbauer, Modesto, CA (US); Philip L. Boyer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 11/021,730

(22) Filed: Dec. 22, 2004

(65) Prior Publication Data

US 2006/0136482 A1    Jun. 22, 2006

(51) Int. Cl.
    G06F 17/00    (2006.01)
(52) U.S. Cl. .................... 707/102; 707/100; 707/103 R
(58) Field of Classification Search ................ 717/108; 705/10; 707/102, 103 R
    See application file for complete search history.

(56) References Cited

U.S. PATENT DOCUMENTS

| | | | |
|---|---|---|---|
| 5,627,979 | A | 5/1997 | Chang et al. |
| 5,699,310 | A * | 12/1997 | Garloff et al. ............... 717/108 |
| 6,199,195 | B1 | 3/2001 | Goodwin et al. |
| 6,289,382 | B1 | 9/2001 | Bowman-Amuah |
| 6,292,932 | B1 | 9/2001 | Baisley et al. |
| 6,477,527 | B2 | 11/2002 | Carey et al. |
| 2001/0051948 | A1 | 12/2001 | Srinivasan et al. |
| 2002/0184264 | A1 | 12/2002 | Berg et al. |
| 2003/0058277 | A1 | 3/2003 | Bowman-Amuah |
| 2003/0084424 | A1 | 5/2003 | Reddy et al. |
| 2003/0110073 | A1 * | 6/2003 | Briel et al. .................... 705/10 |
| 2003/0135657 | A1 | 7/2003 | Barker et al. |
| 2003/0149934 | A1 * | 8/2003 | Worden ........................ 715/513 |
| 2003/0163479 | A1 | 8/2003 | Mathews et al. |
| 2003/0188293 | A1 * | 10/2003 | Boucher ....................... 717/114 |
| 2003/0208505 | A1 | 11/2003 | Mullins et al. |
| 2004/0093344 | A1 | 5/2004 | Berger et al. |

(Continued)

FOREIGN PATENT DOCUMENTS

EP    0 973 091    1/2000

(Continued)

OTHER PUBLICATIONS

Fu et al., "Dynamic vp-tree indexing for n-nearest neighbor search given pair-wise distances", the VLDB Journal (2000) :154-173, [online], Jul. 2000, [retrieved on Sep. 11, 2008]. Retrieved from the Internet:<http://portal.acm.org/citation.cfm?id=765229.765232>.*

(Continued)

*Primary Examiner*—Jean Bolte Fleurantin
*Assistant Examiner*—Dennis Myint
(74) *Attorney, Agent, or Firm*—Janaki Davda; Konrad Raynes & Victor LLP

(57) ABSTRACT

Disclosed is a technique for processing a base model. The base model is received. Then, the base model is used to create a ViewType comprising a ViewType object, one or more ViewList objects corresponding to classes in the base model, and one or more ViewElem objects corresponding to attributes in the base model.

8 Claims, 14 Drawing Sheets

U.S. PATENT DOCUMENTS

| | | | |
|---|---|---|---|
| 2004/0103393 | A1 | 5/2004 | Reddy et al. |
| 2004/0216085 | A1* | 10/2004 | Wilson et al. ............... 717/108 |
| 2005/0050068 | A1 | 3/2005 | Vaschillo et al. |
| 2005/0108684 | A1 | 5/2005 | Sohn et al. |

FOREIGN PATENT DOCUMENTS

| | | |
|---|---|---|
| WO | WO-01/16668 | 3/2001 |
| WO | WO-01/16704 | 3/2001 |
| WO | WO-01/16705 | 3/2001 |
| WO | WO-01/16706 | 3/2001 |
| WO | WO-01/16723 | 3/2001 |
| WO | WO-01/16724 | 3/2001 |
| WO | WO-01/16726 | 3/2001 |
| WO | WO-01/16727 | 3/2001 |
| WO | WO-01/16728 | 3/2001 |
| WO | WO-01/16729 | 3/2001 |
| WO | WO-01/16733 | 3/2001 |
| WO | WO-01/16734 | 3/2001 |
| WO | WO-01/16735 | 3/2001 |
| WO | WO-01/16739 | 3/2001 |
| WO | WO-01/17194 | 3/2001 |
| WO | WO-01/17195 | 3/2001 |

OTHER PUBLICATIONS

Hjaltason et al., "Distance Browsing in Databases", ACM Transactions on Database Systems, vol. 24, No. 2, 265-318, [online] Jun. 1999, [retrieved on Sep. 11, 2008]. Retreived from the Internet: <URL: http://delivery.acm.org/10.1145/330000/320255/p265-hjaltason.pdf?key1=320255&key2=4416411221&coll=ACM&dl=ACM&CFID=2423720&CFTOKEN=51865390.*

Cooperative Research Centre for Distributed Systems Technology (DSTC). "Meta-Object Facility", [online], Jan. 17, 1997, [Retrieved on Oct. 12, 2001]. Retrieved from the Internet at <URL: http://www.dstc.edu.au/Research/Projects/MOF/Publications/OMG/MOF/dstc_mof.pdf>.

Egyed, A., "Integrating Architectural Views in UML", *Technical Report*, [online], Mar. 10, 1999, [Retrieved on Oct. 12, 2001]. Retrieved from the Internet at <URL: http://sunset.usc.edu/publications/techrpts/1999/usccse99-514/usccse99-514.pdf>.

Felsinger, R., "UML Project Plan", [online], Jan. 29, 2001, [Retrieved on Oct. 12, 2001]. Retrieved from the Internet at <URL: http://www.felsinger.com/downloads/UMLProjectPlan.pdf>.

Lagerweij, W., "Design of an Object Oriented Framework Using the Unified Modeling Language", [online], [Retrieved on Oct. 12, 2001]. Retrieved from the Internet at <URL: http://www.euronet.nl/~wouterla/thesis/scriptie/thesis.html>.

Object Management Group (OMG), "Common Warehouse Metamodel (CWM) Specification", [online], Feb. 11, 2000, [Retrieved on Oct. 12, 2001]. Retrieved from the Internet at <URL: http://www.omg.org/docs/ad/00-01-01.pdf>.

U.S. Patent Application, filed Dec. 22, 2004, entitled "Using Viewtypes for Accessing Instance Data Structured by a Base Model", invented by S.T. Conn, A.M. Silberbauer, and P.L. Boyer.

U.S. Patent Application, filed Dec. 22, 2004, entitled "Generating a Relational View for a Base Model Schema", invented by Boyer, P.L., S.T. Conn, and A.M. Silberbauer.

Atkinson, C. and T. Kuhne, "Model-Driven Development: A Metamodeling Foundation", IEEE Software, vol. 20, Iss. 5, Sep. 2003, pp. 36-41.

Braganholo, V.P., S.B. Davidson, and C.A. Heuser, "From XML View Updates to Relational View Updates: Old Solutions to a New Problem", In the Proceedings of the 30th VLDB Conference, 2004, pp. 276-287.

Brown, A., "An Introduction to Model Driven Architecture- Part I: MDA and Today's Systems", [online], Feb. 17, 2004, [retrieved on Jul. 13, 2007], retrieved from the Internet at <URL: http://www.ibm.com/developerworks/rational/library/3100.html>, 15 pp.

Budinsky, F., G. Decandio, R. Earle, T. Francis, J. Jones, J .Li, M. Nally, C. Nelin, V. Popescu, S. Rich, A. Ryman, and T. Wilson, "WebSphere Studio Overview", IBM Systems Journal, vol. 43, No. 2, 2004, pp. 384-419.

Iyengar, S., "Business Process Integration Using UML and BPEL4WS," SI-SE 2004, Mar. 2004, 60 pp.

Kuhn, H., F. Bayer, S. Junginger, and D. Karagiannis, "Enterprise Model Integration", Lecture Notes in Computer Science, Issue 2738, 2003, pp. 379-392.

Mishra, S., and A. Beaulieu, "Mastering Oracle SQL," O'Reilly & Associates, Sebastopol, CA, Apr. 2002, pp. 1-2, 14-18, 43-54, 77-78, and 159-162.

Rayside, D., M. Litoiu, M. Storey, C. Best, and R. Lintern, "Visualizing Flow Diagrams in WebSphere Studio Using SHriMP Views", Information Systems Frontiers, vol. 5, No. 2, Apr. 2003, pp. 161-174.

Bezivin, J. and R. Lemesle, "Towards a True Reflective Modeling Scheme", Lecture Notes in Computer Science, vol. 1826, Proceedings of the 1st OOPSLA Workshop on Reflection and Software Engineering, 1999, pp. 21-38.

Boger, M., M. Jeckle, S. Mueller, and J. Fransson, "Diagram Interchange for UML", Lecture Notes in Computer Science, vol. 2460, Proceedings of the 5th International Conference on The Unified Modeling Language, 2002, pp. 398-411.

Braganholo, V.P., S.B. Davidson, and C.A. Heuser, "Propagating XML View Updates to a Relational Database", Technical Report No. RP-341, Feb. 2004, pp. 1-31.

Braganholo, V.P., S.B. Davidson, and C.A. Heuser, "Reasoning About the Updatability of XML Views over Relational Databases", University of Pennsylvania Department of Computer & Information Science Technical Reports (CIS), 2003, 18 pp.

Kovacs, Z., R. McClatchey, J-M. Le Goff, and N. Baker, "Patterns for Integrating Manufacturing Product and Process Models", Proceedings of the Third International Enterprise Distributed Object Computing Conference, 1999, pp. 37-48.

Bezivin, J. and R. Lemesle, "Towards a True Reflective Modeling Scheme", Reflection and Software Engineering, LNCS 1826, Springer-Verlag, Berlin, Germany, © 2000, pp. 21-38.

Patent Abstract for EP0973091, Joachim F. Sobich, published on Jan. 19, 2000, 1 pg.

U.S. Appl. No. 12/101,884, filed on Apr. 11, 2008, entitled "Generating A Relational View For A Base Model Schema", invented by Conn, S.T., A.M. Silberbauer, and P.L. Boyer, 31 pp.

U.S. Appl. No. 12/167,177, filed on Jul. 2, 2008, entitled "Using Viewtypes For Accessing Instance Data Structured By A Base Model", invented by Conn, S.T., A.M. Silberbauer, and P.L. Boyer, 28 pp.

\* cited by examiner

DEFINING AND GENERATING A VIEWTYPE FOR A BASE MODEL

CROSS-REFERENCE TO RELATED APPLICATIONS

This application is related to the following commonly assigned and co-pending U.S. patent applications:

U.S. patent application Ser. No. 11/021,898, entitled "USING VIEWTYPES FOR ACCESSING INSTANCE DATA STRUCTURED BY A BASE MODEL," by S. Conn, et al.; and U.S. patent application Ser. No. 11/021,796, entitled "GENERATING A RELATIONAL VIEW FOR A BASE MODEL SCHEMA," by P. Boyer et al.;

each of which is filed on the same date herewith, and which is incorporated by reference herein in its entirety.

BACKGROUND

1. Field

The present invention is related to defining and generating a ViewType for a base model.

2. Description of the Related Art

An Essential Meta-Object Facility (EMOF) specification describes a framework for describing and representing metadata (i.e., data describing other data). The EMOF specification provides EMOF model constructs that enable creation of metadata models. A metadata model includes objects described by EMOF classes (defined by the EMOF model), links that connect objects described by EMOF associations, and data values. An EMOF class may include a class name, attributes, operations, association references, and other elements. An association reference enables an EMOF object to be "aware" of being in a relationship with other objects via an association, and the relationship links may be navigated or traversed to get to other data in the model (e.g., to perform operations on objects in a metadata model). An EMOF class may inherit characteristics (e.g., attributes, operations, etc.) from other EMOF classes.

Unified Modeling Language (UML) is a notational language for specifying and visualizing software, (e.g., object-oriented projects) and was developed by the Object Management Group (OMG). An EMOF metadata model may be represented using a UML model. For more information regarding EMOF and UML, see www.omg.org.

When defining an EMOF-based model in a relational database, the resulting relational database schema needed for representing the EMOF-based model may be substantially complex. Consequently, dealing with instance data for classes of the model can also be very complicated.

Thus, there is a need in the art for more simply defining and generating a mechanism for scoping models, such as an EMOF-based model.

SUMMARY OF THE INVENTION

Provided are a method, system, and program for processing a base model. The base model is received. Then, the base model is used to create a ViewType comprising a ViewType object, one or more ViewList objects corresponding to classes in the base model, and one or more ViewElem objects corresponding to attributes in the base model.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the invention. It is understood that other implementations may be utilized and structural and operational changes may be made without departing from the scope of implementations of the invention.

Figure 1:
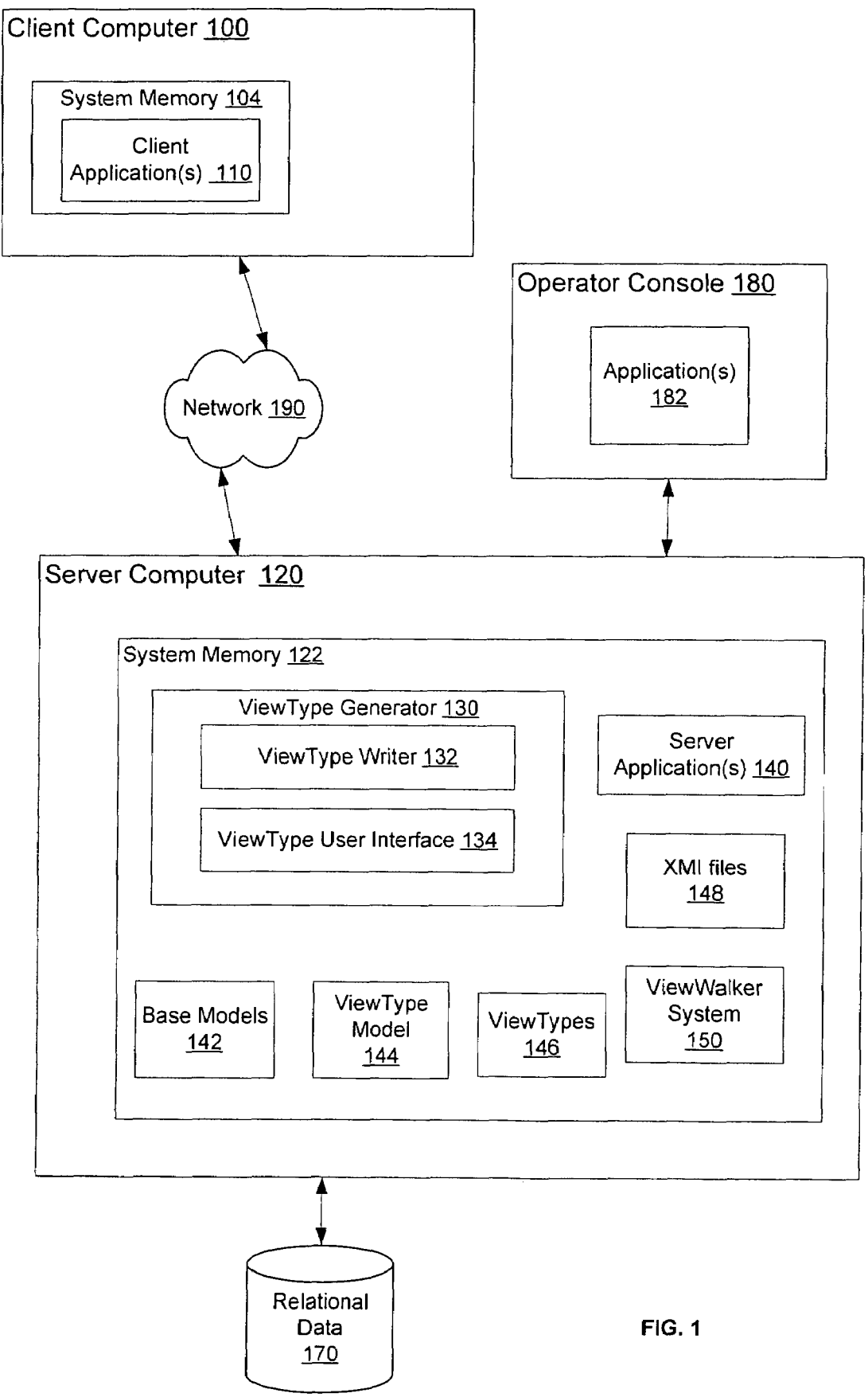
FIG. 1 illustrates, in a block diagram, a computing environment in accordance with certain implementations of the invention.

FIG. 1 illustrates, in a block diagram, a computing environment in accordance with certain implementations of the invention. A client computer 100 is connected via a network 190 to a server computer 120. The client computer 100 includes system memory 104, which may be implemented in volatile and/or non-volatile devices. One or more client applications 110 may execute in the system memory 104.

The server computer 120 includes system memory 122, which may be implemented in volatile and/or non-volatile devices. System memory 122 may store base models 142, a ViewType model 144, and ViewTypes 146. A ViewType 146 uses a base model (i.e., a subset of the base model or the base model in its entirety). For example, a ViewType 146 that uses the base model in its entirety may be referred to as a comprehensive ViewType. A ViewType 146 references classes, attributes, and associations of a base model 142 (i.e., either a subset or in its entirety) as ViewType objects. For example, a ViewType 146 uses parts of a base model 142 by naming classes from the base model. ViewType objects of a ViewType 146 may be defined by a ViewType model 144.

A ViewType generator 130 executes in the system memory 122 and generates a ViewType 146 from a base model 142. The ViewType 146 is built using the ViewType model 144. The base model 142 and the ViewType 146 may be represented with respective XMI files 148. In certain implementations of the invention, the ViewType generator 130 includes two subcomponents: a ViewType writer 132 and a ViewType user interface 134.

XMI was proposed by the Object Management Group (OMG) and uses Extensible Markup Language (XML) to exchange information about metadata. XMI helps programmers using the Unified Modeling Language (UML) with different languages and development tools to exchange their data models with each other. The XMI format standardizes how any set of metadata is described and enables users across many industries and operating environments to see data the same way.

The ViewType writer 132 is used to create ViewType 146 objects based on a base model 142 designated by the user. The ViewType writer 132 validates ViewType objects against the classes, attributes, and associations declared in an EMOF-based model. The ViewType writer 132 writes the correctly formatted and validated ViewType to an XMI file 148. The ViewType writer 132 can also build a comprehensive View-Type of a base model 142 starting at a user-specified root class and recursively including all attributes, associations, and related classes.

The ViewType user interface 134 allows a user to graphically build and maintain a valid ViewType 146 based on classes defined in a user-specified base model 142 (e.g., EMOF-based models) and/or from an existing ViewType. From the ViewType user interface 134, a user is also provided with facilities for nesting ViewTypes, which avoids redundant definitions of ViewType branches, and for referring to "proxy" classes, which may define instance data, at runtime, that is manipulated using other ViewTypes. One or more server applications 140 and a ViewWalker System 150 execute in system memory 122. A ViewType user interface 134 is a type of Graphical User Interface (GUI) and may be displayed at the client computer 100 by the ViewType generator 130.

The server computer 120 provides the client computer 100 with access to data in a relational data store 170. An operator console 180 executes one or more applications 182 and is used to access the server computer 120.

The client computer 100 may comprise any computing device known in the art, such as a server, mainframe, workstatation, personal computer, hand held computer, laptop telephony device, network appliance, etc. The network 190 may comprise any type of network, such as, for example, a Storage Area Network (SAN), a Local Area Network (LAN), Wide Area Network (WAN), the Internet, an Intranet, etc. The relational data store 170 may comprise an array of storage devices, such as Direct Access Storage Devices (DASDs), Just a Bunch of Disks (JBOD), Redundant Array of Independent Disks (RAID), virtualization device, etc.

Figure 2:
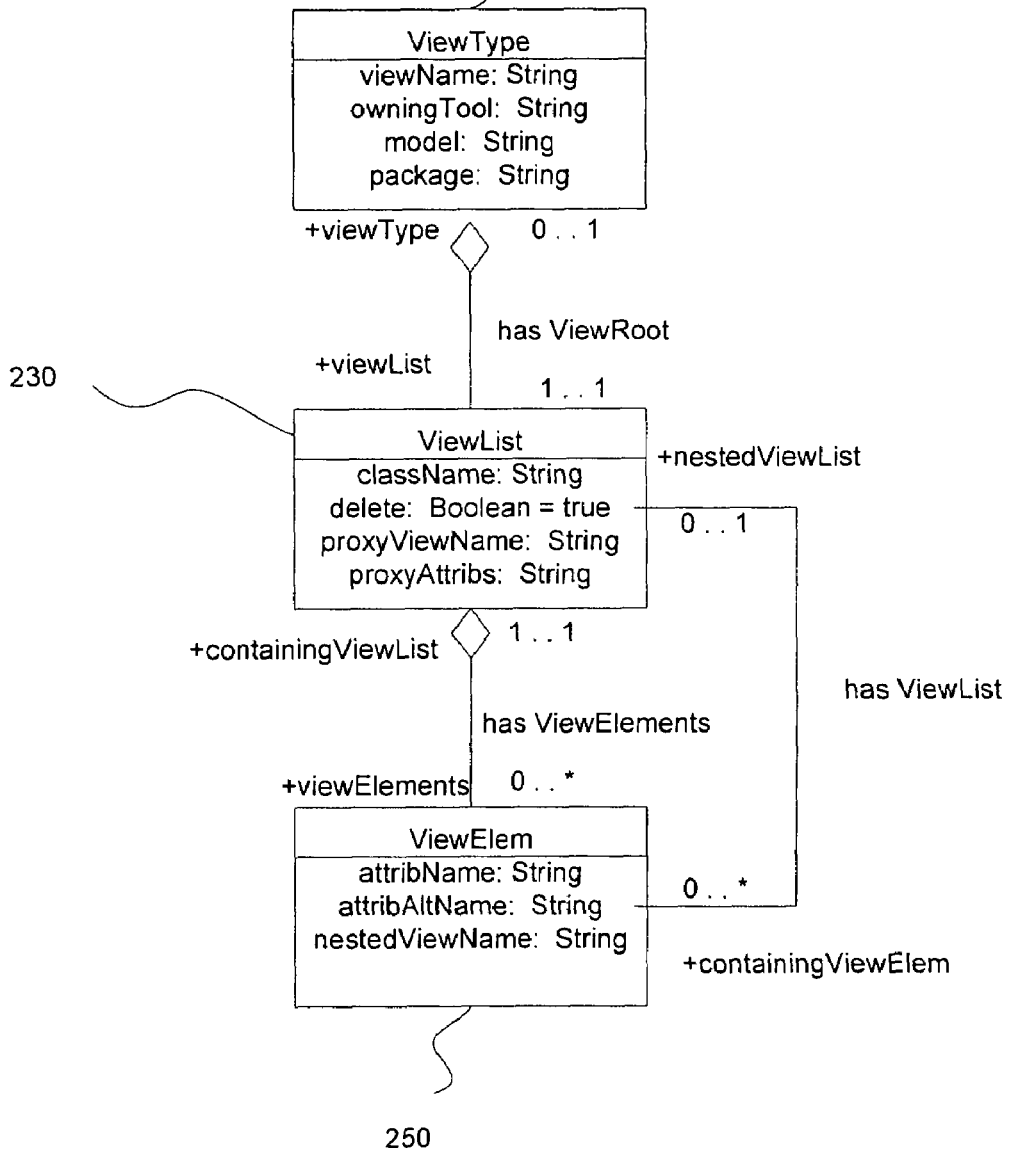
FIG. 2 illustrates a ViewType model in accordance with certain implementations of the invention.

FIG. 2 illustrates a ViewType model 200 in accordance with certain implementations of the invention. The ViewType model 200 includes a ViewType class 210, a ViewList class 230, and a ViewElem class 250, along with the attributes and associations of the classes. An instance of the ViewType class 210 (also referred to as a "ViewType object") describes the main attributes of a ViewType and includes, for example, a viewName attribute for the name of the ViewType, a model attribute for the name of the base model on which the View-Type is based, a package name attribute, and an optional reference attribute for the name of the tool that owns (i.e., "created") the ViewType. The root ViewType instance has one association to a root ViewList instance. A package may be described in the UML/EMOF notation used for scoping data in an XMI file. A package may have associated attributes (e.g., definitions of special tags used in the XMI file, definitions of transformation rules, etc.).

A ViewList instance is also referred to as a "ViewList object." The root ViewList instance and all other instances of the ViewList class contain information about classes found in the base model. The ViewList class 230 includes an attribute called className that names the base model class that the ViewList represents. The ViewList class 230 also has a delete flag, which is used to indicate to a delete function whether or not base model objects should be deleted within the scope of the ViewType. A ViewList class 230 also may include a proxyViewName and proxyAttribs attributes. Presence of a value in the proxyViewName attribute indicates that the base model class represented by the ViewList class is a placeholder, and the details of the base model class are described by another ViewType class' ViewList class. The set of attribute names listed in the ViewList's proxyAttribs attribute specify which of the proxied class' attributes are to be processed with a ViewType instance. The proxyViewName attribute and the association to a ViewElem in a ViewList instance are mutually exclusive; if a ViewList instance does not refer to a proxy, the ViewList instance may alternatively have an association to a ViewElem. A ViewList instance may also have no association or proxy.

The ViewList instance has an association to a ViewElem instance for each attribute and association in the base model class that needs to be defined in this ViewType for the unit of work for which the ViewType will be used.

Each instance of the ViewElem class 250 has an attribute called attribName whose value matches the name of the attribute or association the ViewElem class represents in the base model class. A ViewElem instance of a ViewElem class 250 may have a value in its attribAltName attribute to specify an alternate name for the represented attribute. The attribAltName may be used to ensure uniqueness of the attribute name within the set of ViewElem instances for a ViewList instance. If a ViewElem instance represents an atomic type of attribute, such as an integer type or a string type, then the ViewElem instance will not have a nested ViewList instance or ViewName instance. If, on the other hand, a ViewElem instance represents an attribute that is a complex type represented by a base model class or represents a base model association, then the ViewElem instance will either be connected to a nested ViewList instance through a hasViewList association or have a value in its nestedViewName attribute. A hasViewList association connects the ViewElem instance to a ViewList instance for the base model's associated class and that ViewList instance defines the associated base model class' attributes, associations, etc. For the hasViewList relationship, the ViewList instance has a containing ViewElem instance. A value in the nestedViewName attribute names a ViewType instance whose root ViewList instance represents the base model's associated class, and the rest of that ViewType is used to define the associated base model class' structure.

When defining the ViewType, a recursive type of model is used that works its way down to the leaf-most nodes that should be traversed. At the point in the ViewType definition where the leaf-most nodes are described, there is a ViewElem. At the intermediate points in the ViewType definition where the tree continues to be defined, a ViewElem would be the source of a hasViewList relationship to another ViewList rooted on a ViewElem, and so this continues until the hasViewList relationship is not used (i.e., at the leaf-most node).

In certain implementations of the invention, a ViewElem instance representing an attribute or association may be used by one ViewList instance representing a class. To allow for reducing ViewType size, a ViewList instance may be nested by multiple ViewElem instances. Also a ViewType instance may be named as a nestedViewName by multiple ViewElem instances.

In order to define and process a subset of a base model required for a logical unit of work, implementations of the invention enable defining of ViewTypes 146. A ViewType 146 may be described as a user-defined scope or grouping of interrelated objects that can be used to access and manipulate instance data for a base model 142. A ViewType 146 references classes from the base model 142, starting from a root class, and identifies any attributes and/or associations to the base model classes. The ViewType 146 branches out in a tree type of structure, describing each of the associated classes needed by a logical unit of work. ViewTypes 146 are used to programmatically manipulate instances of the base model 142 at a less granular level than the class or object.

In certain implementations of the invention, a ViewType 146 is defined using an EMOF-based model (i.e., a type of base model 142). The ViewType 146 is described in an XMI format based on the ViewType Document Type Definition (DTD). A ViewType DTD may be described as a definition for a ViewType model, which contains the ViewType, ViewList, and ViewElem classes and associations. The following is a sample ViewType DTD in accordance with certain implementations of the invention:

```
<?xml version="1.0" encoding="UTF-8"?>

<!-- Generated by: XMI Application Framework 1.15 -->
<!-- Date: Fri Jul 06 08:29:22 PDT 2001 -->

<!-- _____ -->
<!-- This section of the DTD contains XML declarations required by XMI. -->
<!-- _____ -->

<!-- _____ -->
<!-- XMI is the top-level XML element for XMI transfer text   -->
```

Docket No. SVL920030036US1
Firm No. 0054.0022

```
<!-- _____ -->

<!ELEMENT XMI (XMI.header?, XMI.content?, XMI.difference*,
        XMI.extensions*) >
<!ATTLIST XMI
        xmi.version CDATA #FIXED "1.1"
        timestamp CDATA #IMPLIED
        verified (true | false) #IMPLIED
>

<!-- _____ -->
<!-- XMI.header contains documentation and identifies the model,  -->
<!-- metamodel, and metametamodel                                  -->
<!-- _____ -->

<!ELEMENT XMI.header (XMI.documentation?, XMI.model*, XMI.metamodel*,
        XMI.metametamodel*, XMI.import*) >

<!-- _____ -->
<!-- documentation for transfer data                              -->
<!-- _____ -->

<!ELEMENT XMI.documentation (#PCDATA | XMI.owner | XMI.contact |
            XMI.longDescription | XMI.shortDescription |
            XMI.exporter | XMI.exporterVersion |
            XMI.notice)* >
<!ELEMENT XMI.owner ANY >
<!ELEMENT XMI.contact ANY >
<!ELEMENT XMI.longDescription ANY >
```

```
<!ELEMENT XMI.shortDescription ANY >
<!ELEMENT XMI.exporter ANY >
<!ELEMENT XMI.exporterVersion ANY >
<!ELEMENT XMI.exporterID ANY >
<!ELEMENT XMI.notice ANY >

<!-- _____ -->
<!-- XMI.element.att defines the attributes that each XML element -->
<!-- that corresponds to a metamodel class must have to conform to -->
<!-- the XMI specification. -->
<!-- _____ -->

<!ENTITY % XMI.element.att
        'xmi.id ID #IMPLIED xmi.label CDATA #IMPLIED xmi.uuid
        CDATA #IMPLIED ' >

<!-- _____ -->
<!-- XMI.link.att defines the attributes that each XML element that -->
<!-- corresponds to a metamodel class must have to enable it to -->
<!-- function as a simple XLink as well as refer to model -->
<!-- constructs within the same XMI file. -->
<!-- _____ -->

<!ENTITY % XMI.link.att
        'href CDATA #IMPLIED xmi.idref IDREF #IMPLIED xml:link
        CDATA #IMPLIED xlink:inline (true | false) #IMPLIED
        xlink:actuate (show | user) #IMPLIED xlink:content-role
```

CDATA #IMPLIED xlink:title CDATA #IMPLIED xlink:show
(embed | replace | new) #IMPLIED xlink:behavior CDATA
IMPLIED' >

<!-- _____ -->
<!-- XMI.model identifies the model(s) being transferred     -->
<!-- _____ -->

```
<!ELEMENT XMI.model ANY >
<!ATTLIST XMI.model
      %XMI.link.att;
      xmi.name    CDATA #REQUIRED
      xmi.version CDATA #IMPLIED
>
```

<!-- _____ -->
<!-- XMI.metamodel identifies the metamodel(s) for the transferred -->
<!-- data                          --> 
<!-- _____ -->

```
<!ELEMENT XMI.metamodel ANY >
<!ATTLIST XMI.metamodel
      %XMI.link.att;
      xmi.name    CDATA #REQUIRED
      xmi.version CDATA #IMPLIED
>
```

<!-- _____ -->

```
<!-- XMI.metametamodel identifies the metametamodel(s) for the   -->
<!-- transferred data                                             -->
<!-- _____ -->

<!ELEMENT XMI.metametamodel ANY >
<!ATTLIST XMI.metametamodel
    %XMI.link.att;
    xmi.name     CDATA #REQUIRED
    xmi.version  CDATA #IMPLIED
>

<!-- _____ -->
<!-- XMI.metametamodel identifies other files associated with the -->
<!-- transferred data                                             -->
<!-- _____ -->

<!ELEMENT XMI.import ANY >
<!ATTLIST XMI.import
    %XMI.link.att;
    xmi.name     CDATA #REQUIRED
    xmi.version  CDATA #IMPLIED
>

<!-- _____ -->
<!-- XMI.content is the actual data being transferred             -->
<!-- _____ -->

<!ELEMENT XMI.content ANY >
```

```
<!-- _____ -->
<!-- XMI.extensions contains data to transfer that does not conform -->
<!-- to the metamodel(s) in the header -->
<!-- _____ -->

<!ELEMENT XMI.extensions ANY >
<!ATTLIST XMI.extensions
        xmi.extender CDATA #REQUIRED
>

<!-- _____ -->
<!-- extension contains information related to a specific model -->
<!-- construct that is not defined in the metamodel(s) in the header -->
<!-- _____ -->

<!ELEMENT XMI.extension ANY >
<!ATTLIST XMI.extension
        %XMI.element.att;
        %XMI.link.att;
        xmi.extender CDATA #REQUIRED
        xmi.extenderID CDATA #IMPLIED
>

<!-- _____ -->
<!-- XMI.difference holds XML elements representing differences to a -->
<!-- base model -->
<!-- _____ -->

<!ELEMENT XMI.difference (XMI.difference | XMI.delete | XMI.add |
```

```
        XMI.replace)* >
<!ATTLIST XMI.difference
      %XMI.element.att;
      %XMI.link.att;
>

<!-- _____ -->
<!-- XMI.delete represents a deletion from a base model   -->
<!-- _____ -->

<!ELEMENT XMI.delete EMPTY >
<!ATTLIST XMI.delete
      %XMI.element.att;
      %XMI.link.att;
>

<!-- _____ -->
<!-- XMI.add represents an addition to a base model       -->
<!-- _____ -->

<!ELEMENT XMI.add ANY >
<!ATTLIST XMI.add
      %XMI.element.att;
      %XMI.link.att;
      xmi.position CDATA "-1"
>

<!-- _____ -->
<!-- XMI.replace represents the replacement of a model construct -->
```

```
<!-- with another model construct in a base model     -->
<!-- _____ -->

<!ELEMENT XMI.replace ANY >
<!ATTLIST XMI.replace
    %XMI.element.att;
    %XMI.link.att;
    xmi.position CDATA "-1"
>

<!-- _____ -->
<!-- XMI.reference may be used to refer to data types not defined in -->
<!-- the metamodel     -->
<!-- _____ -->

<!ELEMENT XMI.reference ANY >
<!ATTLIST XMI.reference
    %XMI.link.att;
>

<!ATTLIST XMI
    xmlns:viewtype CDATA #IMPLIED
>

<!-- _____ -->
<!-- CLASS: ViewType     -->
<!-- _____ -->
```

```
<!ELEMENT viewtype:ViewType.viewName (#PCDATA | XMI.reference)* >

<!ELEMENT viewtype:ViewType.owningTool (#PCDATA | XMI.reference)* >

<!ELEMENT viewtype:ViewType.model (#PCDATA | XMI.reference)* >

<!ELEMENT viewtype:ViewType.package (#PCDATA | XMI.reference)* >

<!ELEMENT viewtype:ViewType.viewList (viewtype:ViewList)* >

<!ELEMENT viewtype:ViewType (viewtype:ViewType.viewName |
        viewtype:ViewType.owningTool |
        viewtype:ViewType.model |
        viewtype:ViewType.package | XMI.extension |
        viewtype:ViewType.viewList)* >
<!ATTLIST viewtype:ViewType
        viewName CDATA #IMPLIED
        owningTool CDATA #IMPLIED
        model CDATA #IMPLIED
        package CDATA #IMPLIED
        viewList IDREFS #IMPLIED
        %XMI.element.att;
        %XMI.link.att;
>

<!-- _____ -->
<!-- CLASS: ViewList                                    -->
<!-- _____ -->
```

```
<!ELEMENT viewtype:ViewList.className (#PCDATA | XMI.reference)* >

<!ELEMENT viewtype:ViewList.delete EMPTY >
<!ATTLIST viewtype:ViewList.delete
        xmi.value (true | false) #REQUIRED
>

<!ELEMENT viewtype:ViewList.proxyViewName (#PCDATA | XMI.reference)* >

<!ELEMENT viewtype:ViewList.proxyAttribs (#PCDATA | XMI.reference)* >

<!ELEMENT viewtype:ViewList.viewType (viewtype:ViewType)* >

<!ELEMENT viewtype:ViewList.viewElems (viewtype:ViewElem)* >

<!ELEMENT viewtype:ViewList.containingViewElem (viewtype:ViewElem)* >

<!ELEMENT viewtype:ViewList (viewtype:ViewList.className |
                viewtype:ViewList.delete |
                viewtype:ViewList.proxyViewName |
                viewtype:ViewList.proxyAttribs |
                XMI.extension | viewtype:ViewList.viewType |
                viewtype:ViewList.viewElems |
                viewtype:ViewList.containingViewElem)* >
<!ATTLIST viewtype:ViewList
        className CDATA #IMPLIED
        delete (true | false) #IMPLIED
        proxyViewName CDATA #IMPLIED
        proxyAttribs CDATA #IMPLIED
```

```
        viewType IDREFS #IMPLIED
        viewElems IDREFS #IMPLIED
        containingViewElem IDREFS #IMPLIED
        %XMI.element.att;
        %XMI.link.att;
>

<!-- _____ -->
<!-- CLASS: ViewElem                                  -->
<!-- _____ -->

<!ELEMENT viewtype:ViewElem.attribName (#PCDATA | XMI.reference)* >

<!ELEMENT viewtype:ViewElem.attribAltName (#PCDATA | XMI.reference)* >

<!ELEMENT viewtype:ViewElem.nestedViewName (#PCDATA | XMI.reference)* >

<!ELEMENT viewtype:ViewElem.containingViewList (viewtype:ViewList)* >

<!ELEMENT viewtype:ViewElem.nestedViewList (viewtype:ViewList)* >

<!ELEMENT viewtype:ViewElem (viewtype:ViewElem.attribName |
            viewtype:ViewElem.attribAltName |
            viewtype:ViewElem.nestedViewName |
            XMI.extension |
            viewtype:ViewElem.containingViewList |
            viewtype:ViewElem.nestedViewList)* >
<!ATTLIST viewtype:ViewElem
        attribName CDATA #IMPLIED
``` attribAltName CDATA #IMPLIED nestedViewName CDATA #IMPLIED containingViewList IDREFS #IMPLIED nestedViewList IDREFS #IMPLIED %XMI.element.att;

%XMI.link.att;

>=

Non-automated processes for creating ViewTypes 146 in the XMI format have proven to be very time consuming and error-prone. Implementations of the invention enable quickly and easily defining model-validated ViewTypes 146. For example, the ViewType generator 130 allows the user to create and maintain valid ViewType XMI based on a user-specified EMOF-based model. The ViewType XMI describes a subset of base model classes, along with attributes and associations, as ViewType objects. ViewType objects are defined by the ViewType.

Figure 3:
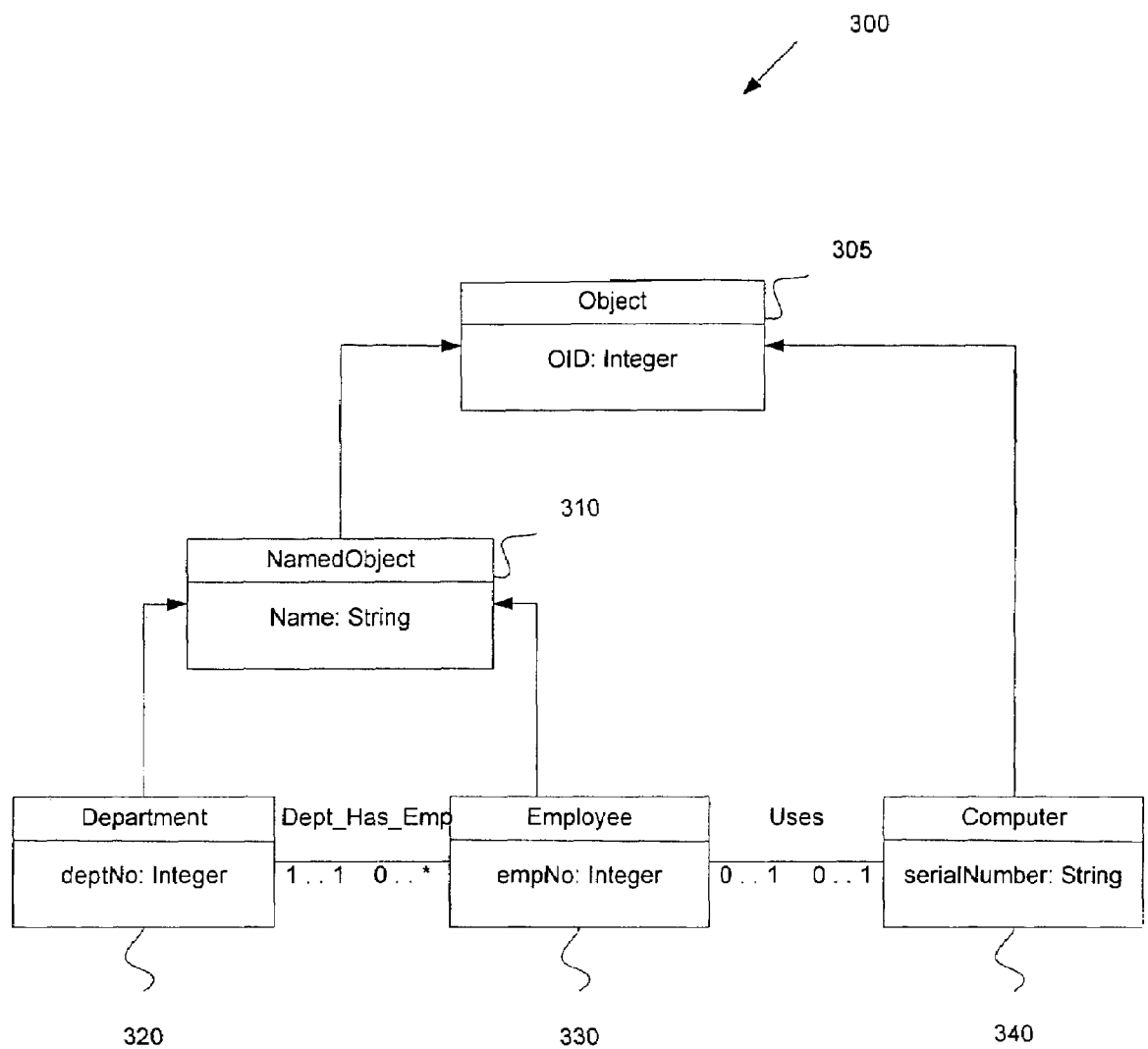
FIG. 3 illustrates an example of a Department-Employee base model that is an EMOF-based model in accordance with certain implementations of the invention.

The purpose of a base model 142 is to represent a set of objects and their relationships. For example, the base model 142 may be an EMOF-based model. FIG. 3 illustrates an example of a Department-Employee base model 300 that is an EMOF-based model in accordance with certain implementations of the invention. For example, the Department-Employee base model 300 describes a set of classes, attributes of the classes, and the associations from each class to other classes. In certain implementations of the invention, a graphical tool may be used to define the classes (e.g., Rational Rose Realtime available from International Business Machines, Corporation). Also, tools may be used to export the model as an XML Metadata Interchange (XMI) document describing the EMOF-based model. That is, certain tools (e.g., Rational Rose Realtime) output a model output file that can be transformed into XMI format, which is provided as input to certain implementations of the invention. The Department-Employee base model 300 includes a NamedObject class 310, which includes a "name" of string type. A Department class 320 includes a department number (labeled "deptNo") of integer type and inherits the characteristics of the NamedObject class 310. An Employee class 330 includes an employee number (labeled "empNo") of integer type and inherits the characteristics of the NamedObject class 310. A Computer class 340 includes a serial number (labeled "serialNumber") of string type. Also, all classes 310, 320, 330, 340 inherit the characteristics (i.e., the OID) of an object class 305 that is the top level class in a base model 142. In addition, an Employee is in one Department, a Department has 0-m (where m may be any integer value) Employees, and an Employee may have a Computer or may not have a Computer (i.e., a 0 . . . 1 relationship).

Because the Department class 320 inherits from the NamedObject class 310, the Department class 320 logically has two attributes: deptNo and name. Likewise, each instance of the Employee class may be thought to have two attributes: empNo and name. In addition, instances of the Department class 310 can be related to instances of the Employee class 330 via the Dept_Has_Emps association. Instances of the Employee class 330 may be related to instances of the Computer class 340 via the Uses association.

Figure 4A:
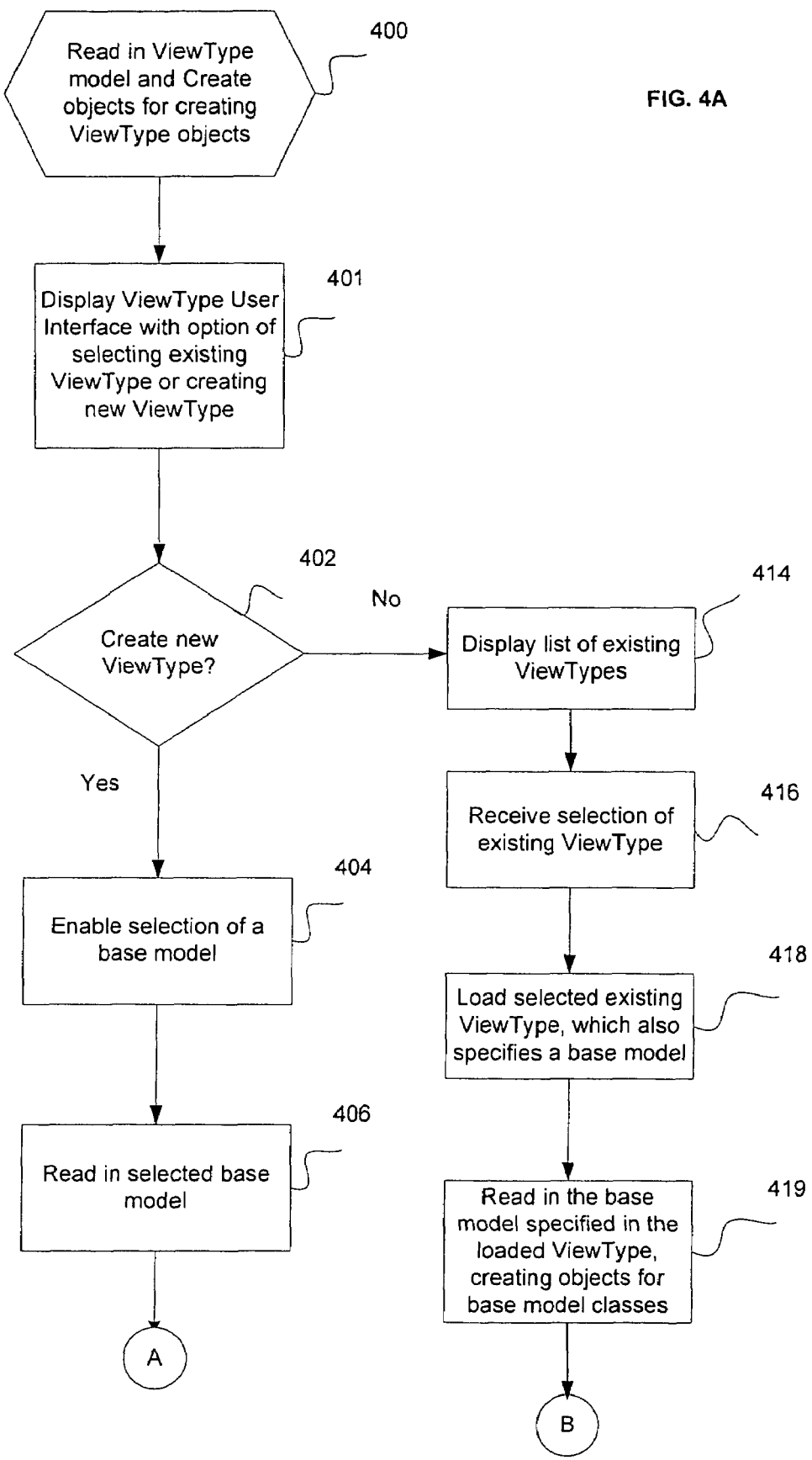
FIGS. 4A and 4B illustrate logic implemented in a ViewType generator to process a base model in accordance with certain implementations of the invention.
Figure 4B:
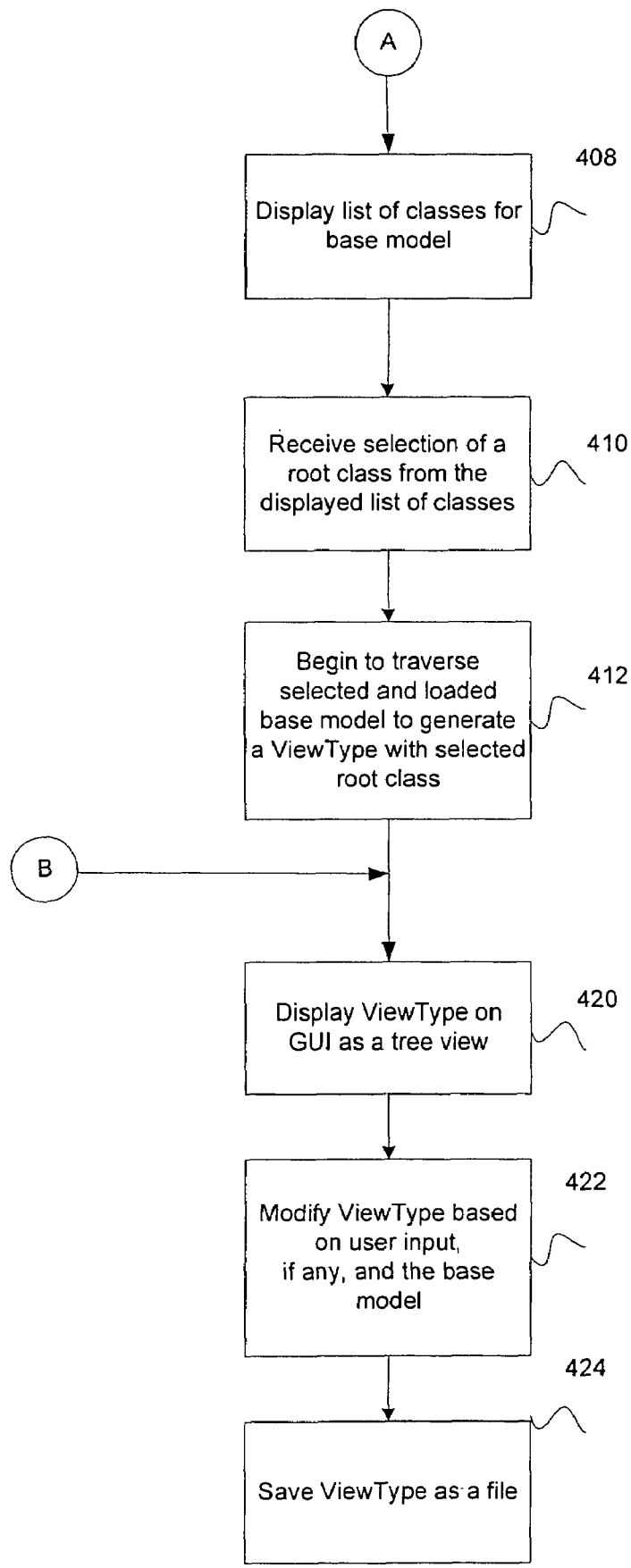
Figure 5:
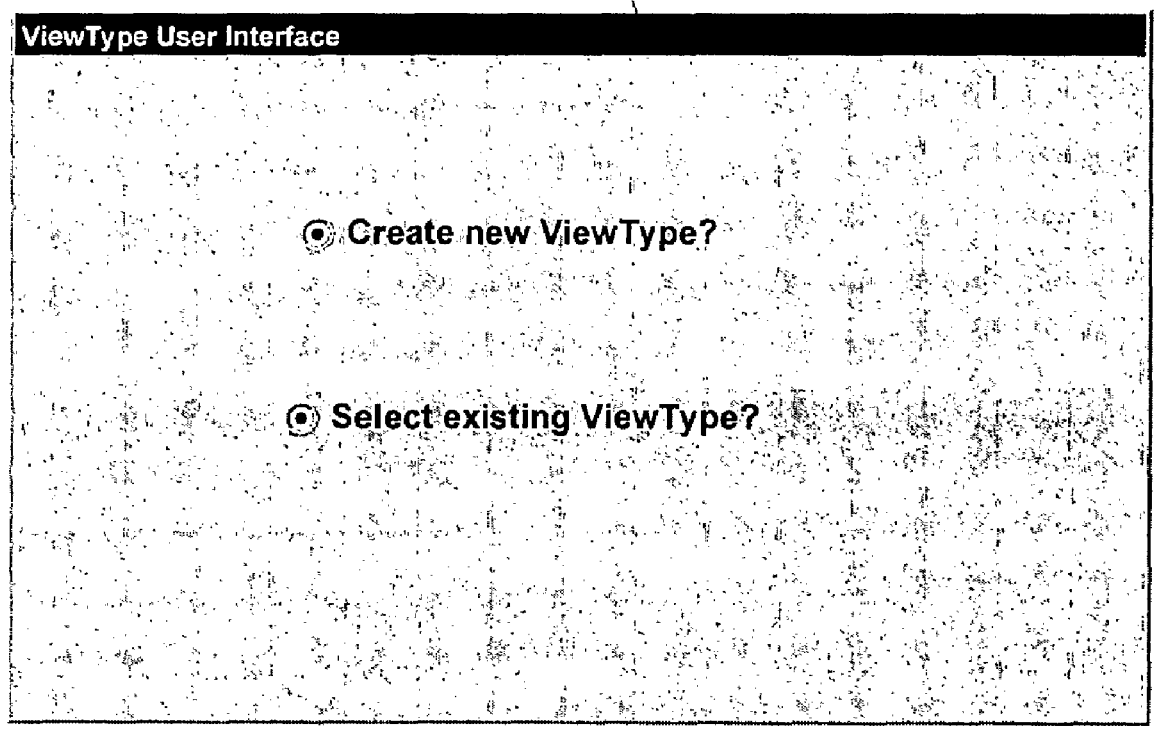
FIG. 5 illustrates a ViewType user interface that provides the option of creating a new ViewType or selecting an existing ViewType in accordance with certain implementations of the invention.

FIGS. 4A and 4B illustrate logic implemented in a ViewType generator 130 to process a base model in accordance with certain implementations of the invention. Prior to the processing described in FIGS. 4A and 4B, one or more base models 142 are created and stored, for example, at the server computer 120. Additionally, EMOF generated classes have been created in a package for the base model. Control begins at block 400 with the ViewType generator 130 reading in the ViewType model and creating objects for creating ViewType objects. Then, in block 401, the ViewType generator 130 displays a ViewType user interface 134 with an option that allows a user to create a new ViewType or select an existing ViewType. FIG. 5 illustrates a ViewType user interface 500 that provides the option of creating a new ViewType or selecting an existing ViewType in accordance with certain implementations of the invention.

Figure 6:
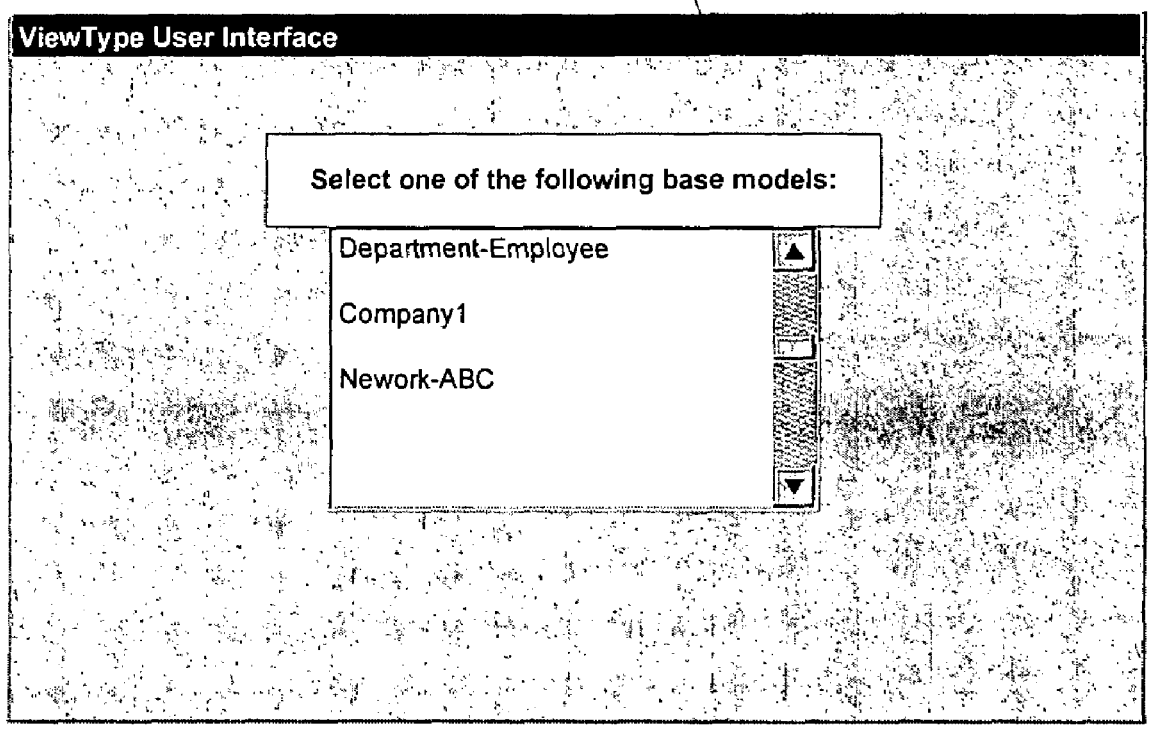
FIG. 6 illustrates a ViewType user interface that allows a user to select a base model from a list of base models in accordance with certain implementations of the invention.

In block 402, if a user has selected creation of a new ViewType, processing continues to block 404, otherwise, processing continues to block 414. In block 404, the ViewType generator 130 enables selection of a base model 142. For example, the ViewType generator 130 may display a ViewType user interface 600 (FIG. 6) that allows a user to select a base model 142 from a list of base models 142. For the example herein, the Department-Employee base model is selected.

In block 406, the ViewType generator 130 reads in the selected base model 142. At this point, the base model 142 may be an EMOF-based model that is in the format of an XMI document. In certain implementations of the invention, the ViewType generator 130 reads in an XMI file representing the base model 142, identifies the classes of the base model 142, and instantiates ViewType objects, ViewList objects, and ViewElem objects for the ViewType 146 from the classes and attributes of the base model 142. Also, by reading the XMI file, the ViewType generator 130 creates the relationships between the ViewType objects, ViewList objects, and ViewElem objects for the ViewType 146.

Figure 7:
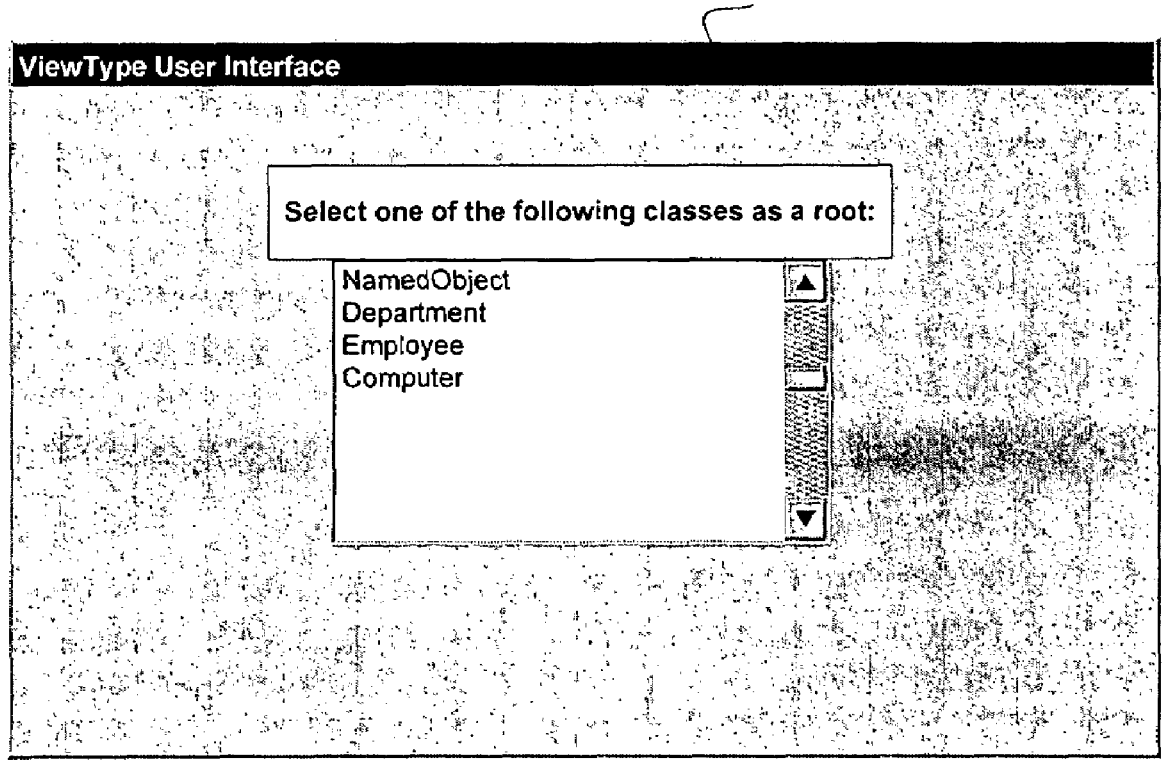
FIG. 7 illustrates a ViewType user interface that displays a list of classes of a base model in accordance with certain implementations of the invention.

In block 408, the ViewType generator 130 displays a list of classes for the selected base model 142. FIG. 7 illustrates a ViewType user interface 700 that displays a list of classes of a base model in accordance with certain implementations of the invention. A user selects one of the classes to be a root of a new ViewType 146. In block 410, a user's selection of one of the classes is received. In the example herein, the Employee class is selected to be the root. In block 412, the ViewType generator 130 begins to traverse the selected and loaded base model 142 to generate a ViewType 146 with the selected root class 412.

Figure 8:
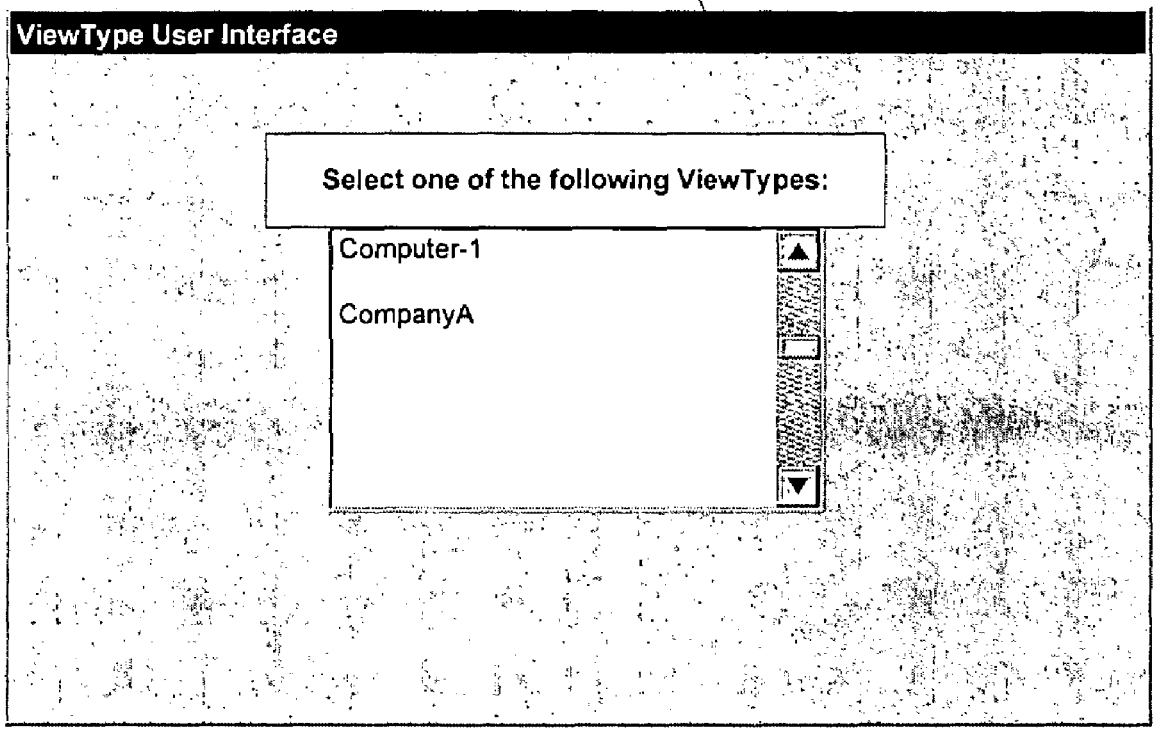
FIG. 8 illustrates a ViewType user interface displaying a list of existing ViewTypes that may be selected by a user in accordance with certain implementations of the invention.

Returning to block 402 (FIG. 4A), if the user chose the option of selecting an existing ViewType, processing continues to block 414. In block 414, the ViewType generator 130 displays a list of existing ViewTypes. FIG. 8 illustrates a ViewType user interface 800 displaying a list of existing ViewTypes that may be selected by a user in accordance with certain implementations of the invention. In block 416, the ViewType generator 130 receives selection of an existing ViewType. In block 418, the ViewType generator 130 loads the selected ViewType, which also specifies the base model. In block 419, the ViewType generator 130 reads in the base model specified in the loaded ViewType, creating objects for base model classes. The ViewType generator 130 is now initialized and ready to provide the attributes and associations available for including in the ViewType from any selected class. In certain implementations of the invention, the ViewType generator 130 loads an XMI file representing the selected ViewType and parses the XMI file to create ViewType objects, ViewList objects, and ViewElem objects for the selected ViewType.

In block 420, the ViewType generator 130 displays a ViewType being created or updated as a tree like structure or "view" (i.e., a type of hierarchy) at the client computer 100 in the ViewType user interface 134. For example, ViewType 1000 (FIG. 10) or 1100 (FIG. 11) may be displayed in a tree view. From the tree like structure or view in the ViewType user interface 134, the user is provided the appropriate class, attribute, and association names from which to build and extend the ViewType 146. In certain implementations of the invention, to create a tree view, the ViewType generator 130 builds a tree view from ViewType objects, ViewList objects, and ViewElem objects that represent the classes and attributes defined by the ViewType for the base model. Also, in creating the tree view, the ViewType generator 130 initializes the ViewType user interface 134 controls.

Figure 9A:
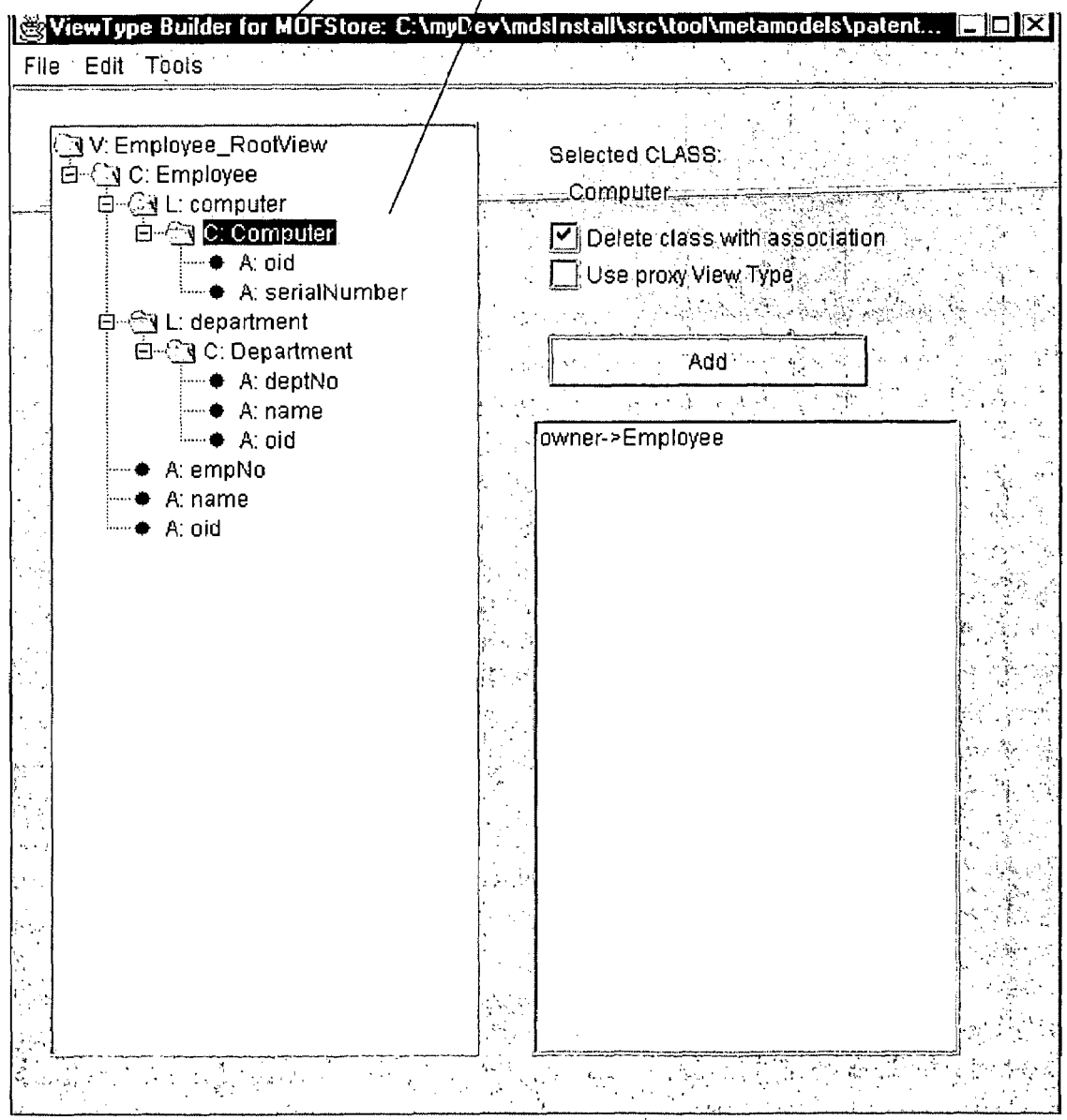
FIGS. 9A and 9B illustrate ViewType user interfaces, respectively, that may be displayed by the ViewType generator in accordance with certain implementations of the invention.
Figure 9B:
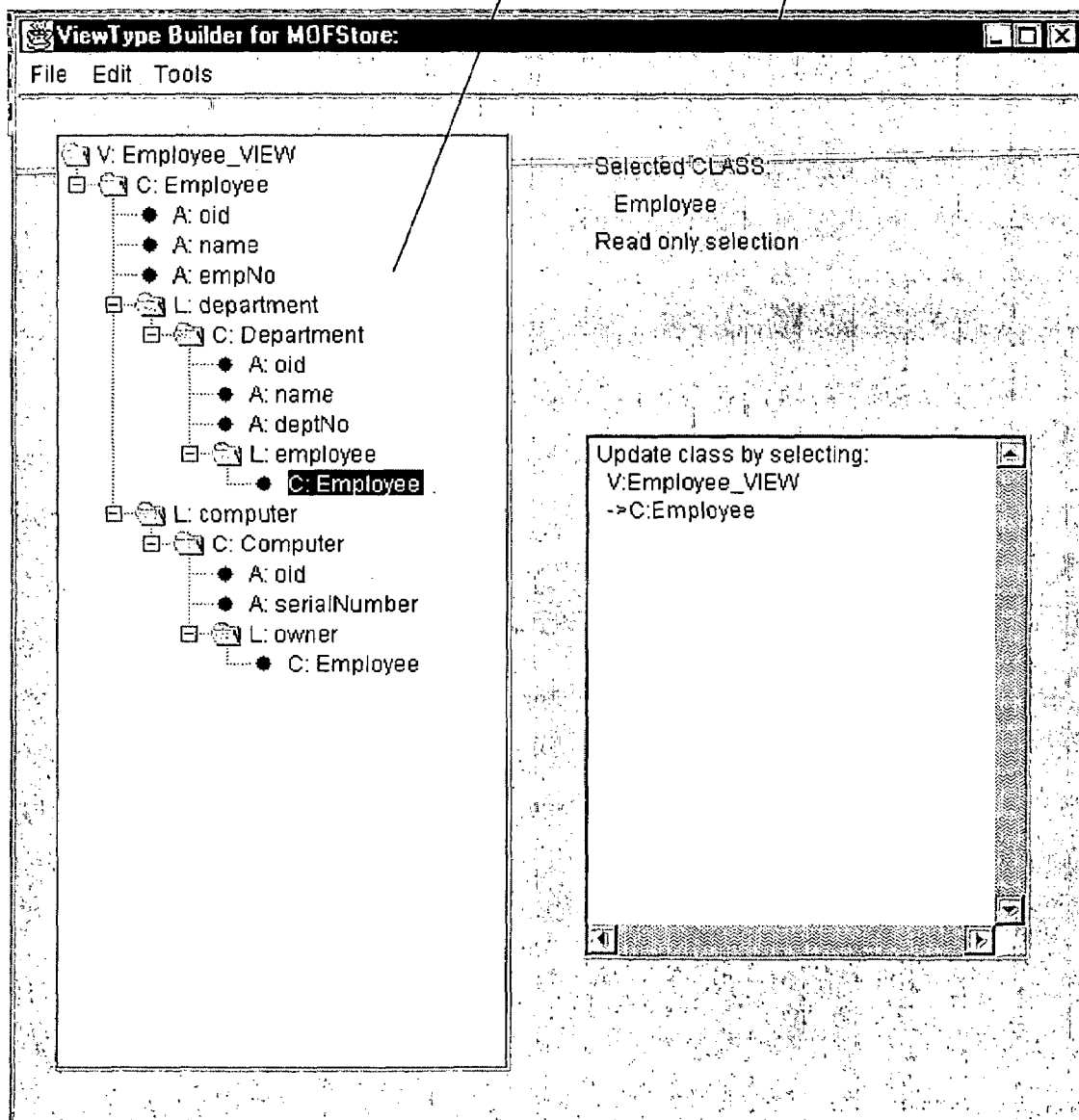

FIGS. 9A and 9B illustrate ViewType user interfaces 900 and 950, respectively, that may be displayed by the ViewType generator 130 in accordance with certain implementations of the invention. In FIGS. 9A and 9B, the notation "V:" refers to a ViewType; the notation "C:" refers to a class; the notation "L:" refers to a link or association; and, the notation "A:" refers to an attribute. In FIG. 9A, an Employee_RootView ViewType 910 is displayed that corresponds to the ViewType 1000 in FIG. 10. The ViewType 1000 is depicted in a tree view. In FIG. 9B, an Employee_VIEW ViewType 960 is displayed that corresponds to the comprehensive ViewType 1100 in FIG. 11.

In block 422, the ViewType generator 130 modifies the ViewType 146 based on input received from a user (if any is received) and based on the base model at client computer 110. In block 424, the ViewType generator 130 saves the ViewType. In certain implementations of the invention, the ViewType generator 130 converts the ViewType into an XMI document and saves the XMI document (i.e., by transforming the definitions in the tree view into an XMI file). The ViewType generator 130 may validate the ViewType before saving the ViewType to an XMI file.

For example, the ViewType 1000 (FIG. 10) may be output as the following XMI by the ViewType generator 130:

```
<xmi:XMI xmi:version="2.0" XMIns:xmi="http://www.omg.org/XMI"
xmlns:ViewType="ViewType.xmi">
  <ViewType:ViewType xmi:id="ViewType_1"
viewName="Employee_RootView" model="patent"
package="tool.metamodels.patent" ViewList="ViewList_1"/>
  <ViewType:ViewList xmi:id="ViewList_1" className="Employee"
ViewType="ViewType_1" ViewElems="ViewElem_1
ViewElem_2 ViewElem_3 ViewElem_4 ViewElem_5"/>
  <ViewType:ViewElem xmi:id="ViewElem_1" attribName="computer"
containingViewList="ViewList_1" nestedViewList="ViewList_2"/>
  <ViewType:ViewList xmi:id="ViewList_2" className="Computer"
ViewElems="ViewElem_6 ViewElem_7"
containingViewElem="ViewElem_1"/>
  <ViewType:ViewElem xmi:id="ViewElem_2"
attribName="department" containingViewList="ViewList_1"
nestedViewList="ViewList_3"/>
  <ViewType:ViewList xmi:id="ViewList_3"
className="Department" ViewElems="ViewElem_8
ViewElem_9 ViewElem_10" containingViewElem="ViewElem_2"/>
  <ViewType:ViewElem xmi:id="ViewElem_3" attribName="empNo"
containingViewList="ViewList_1"/>
  <ViewType:ViewElem xmi:id="ViewElem_4" attribName="name"
containingViewList="ViewList_1"/>
  <ViewType:ViewElem xmi:id="ViewElem_5" attribName="oid"
containingViewList="ViewList_1"/>
  <ViewType:ViewElem xmi:id="ViewElem_6" attribName="oid"
containingViewList="ViewList_2"/>
  <ViewType:ViewElem xmi:id="ViewElem_7"
attribName="serialNumber" containingViewList="ViewList_2"/>
  <ViewType:ViewElem xmi:id="ViewElem_8" attribName="deptNo"
containingViewList="ViewList_3"/>
  <ViewType:ViewElem xmi:id="ViewElem_9" attribName="name"
containingViewList="ViewList_3"/>
  <ViewType:ViewElem xmi:id="ViewElem_10" attribName="oid"
containingViewList="ViewList_3"/>
</xmi:XMI>
```

The ViewType generator 130 function translates the ViewType built for a unit of work to the ViewType XMI format and also ensures that the XMI is both syntactically and semantically correct.

Figure 10:
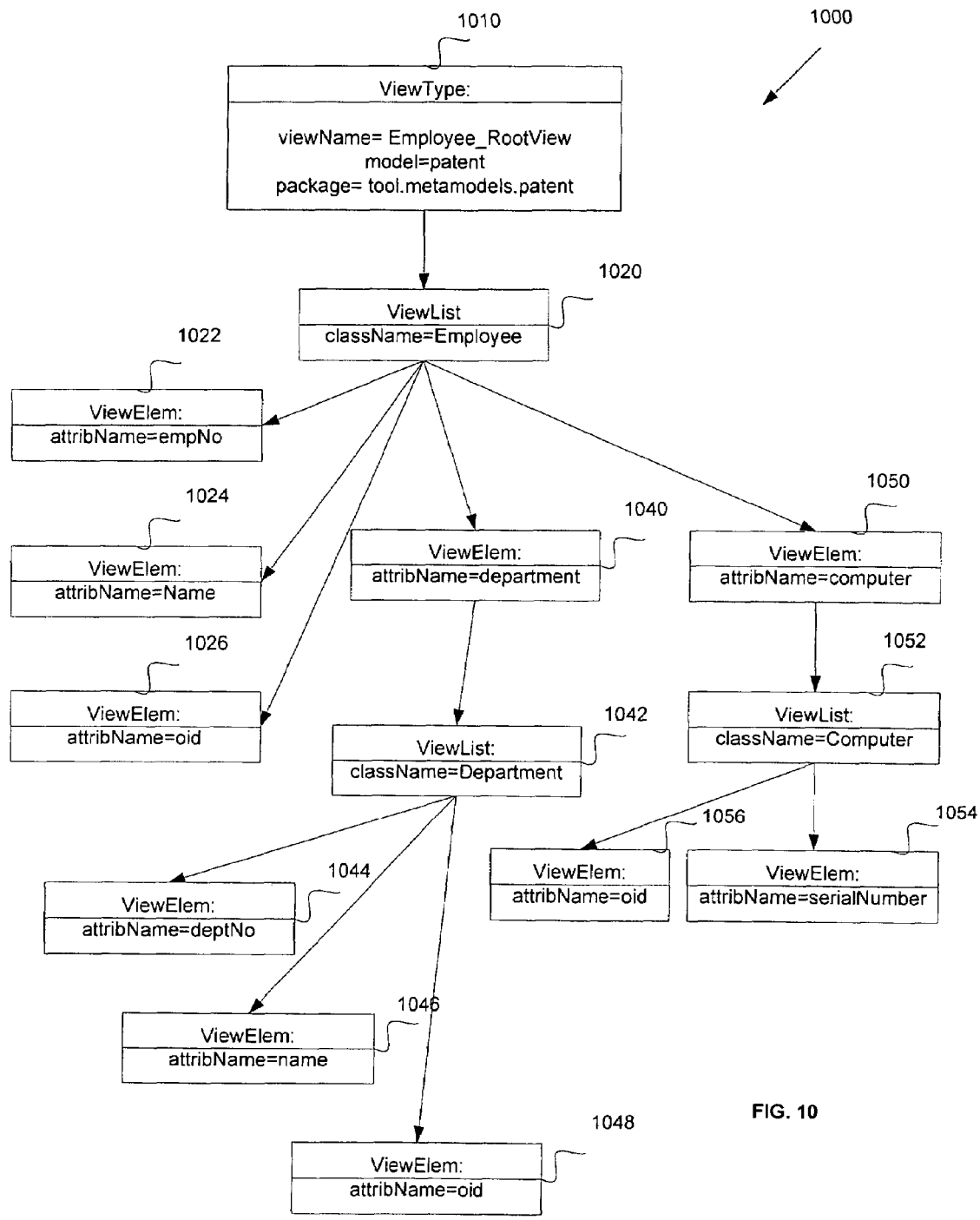
FIG. 10 illustrates an example of a ViewType either read by or generated by a ViewType generator for a Department-Employee base model rooted on an employee class and branching out to include the employee's computer and department in accordance with certain implementations of the invention.

FIG. 10 illustrates an example of a ViewType 1000 either read by or generated by the ViewType generator 130 for the Department-Employee base model (300 in FIG. 3) rooted on the Employee class (330 in FIG. 3) and branching out to include the employee's computer and department in accordance with certain implementations of the invention. ViewType 1000 includes a ViewType object 1010 that indicates the viewName attribute is Employee_RootView, the model attribute is patent, and the package is tool.metamodels.patent. The ViewType 1000 also includes a root ViewList 1020 for the Employee class (330 in FIG. 3), a ViewList 1042 for the Department class (320 in FIG. 3), and a ViewList 1052 for the Computer class (340 in FIG. 3).

ViewList 1020 includes a ViewElem for each selected attribute of the Employee class 330. For example, ViewElem 1022 maps to the attribute named employee number ("empno"). ViewElem 1024 maps to attributed named name (which is inherited by the Employee class 330 from the NamedObject class 310), and ViewElem 1026 maps to an attribute for an object identifier ("oid"). In certain implementations of the invention, an object identifier uniquely identifies data across relational tables. In these certain implementations, each ViewList has a ViewElem to store a unique object identifier. In the example, the ViewList 1020 also has a ViewElem 1040 that is connect to a nested ViewList 1042 corresponding to the Department class 320 and a ViewElem 1060 that is connected to another nested ViewList 1052 corresponding to the Computer class 340.

The ViewList's 1042 className attribute, Department, maps the ViewList 1042 to the Department class 320. The Viewlist 1042 also has a ViewElem for each attribute of the Department class 320. ViewElem 1044 maps to an attribute name for department number ("depno"), ViewElem 1048 maps an attribute name for serial number ("serialNumber"), and ViewElem 1056 maps to an attribute name for an object identifier ("oid").

The ViewList 1052 has a className attribute of Computer which maps the ViewList 1052 to the Computer class. The ViewList 1052 also has a ViewElem for each attribute of the Computer class 240. ViewElem 1054 maps to an attribute name for serial number ("serialNumber"), and ViewElem 1056 maps to an attribute name for an object identifier ("oid").

The following Pseudocode A shows sample XMI for the ViewType 1000 as it might be generated by certain implementations of the ViewType generator 130. Slashes (//) precede descriptive comments in Pseudocode A.

Pseudocode A

```
Main Function:
    1) Call initViewTypeGenerator( )
    2) Call performUserActions( )
        // The initViewTypeGenerator( ) function is used to handle events that
specify creating and updating an instance of the View Type Model rooted on any class
defined in a base model (e.g., from the ViewType user interface, add, remove, select, etc.
events).
end Main Function
```

-continued

Pseudocode A

```
initViewTypeGenerator( ):
    1) If user chooses to create a new ViewType and no base model or package are
specified, then get base model and package names from user
    2) getCollectionOfClasses( )
        // Read through XMI document describing base model and create meta-
object for each class, without instantiating object from class.
    3) If user chooses to select an existing ViewType and specified a file with a
ViewType instance, call Load( ) function
        // The Load( ) function loads the ViewType instance from the file.
    4) Call initUIControls( )
end initViewTypeGenerator( )
getCollectionOfClasses( ):
        // The getCollectionOfClasses function calls a getCollectionOfObjects( )
function to get a collection of objects representing each class in a base model.
    1) Create meta-object instances representing classes in a base model using a tool
(e.g., an EMOF tool)
end getCollectionOfClasses( )
Load( ):
        // This function loads a ViewType instance from a file.
    1) Parse the file to create object instances for the ViewTypes, ViewLists and
ViewElem objects that define the ViewType structure
        // This may be done using classes generated for the ViewType model by
            EMOF)
    2) Display tree view in ViewType user interface
end Load( )
initUIControls( ):
    1) Build a tree structure from the ViewTypes, ViewLists, and ViewElems, that
depicts the classes and attributes defined by the ViewType of the base model
    2) Add controls for listing and selecting the classes and attributes available for
adding to the tree structure at a selected class or attribute
    3) Add buttons and other controls to the ViewType User Interface
end initUIControls( )
performUserActions( ):
// This function is used to handle user triggered actions for building and changing
(adding/removing/updating) nodes in the ViewType's tree structure. Each node maps to
one of the following:
    a) a ViewType instance for either the root of the ViewType or for a nested
        ViewType;
    b) a ViewList instance that maps to a class in the base model; or
    c) a ViewElem instance that maps to an attribute of a class in the base model.
// Some user triggered actions include:
    a) Writing the ViewType structure to a file
    b) Generating and displaying a comprehensive ViewType structure that includes
all classes and attributes connected directly or indirectly to the chosen root class for the
ViewType
    c) Loading a ViewType structure from a file
end performUserActions( )
```

The ViewType generator 130 may also be invoked to generate a comprehensive ViewType from a base model and rooted on a specified model class. The comprehensive ViewType is created by traversing all attributes and associations stemming from the rootclass. For every attribute and association traversed in a base model class, a ViewElem is created and added to the ViewList for that class. All associations are traversed and their target class is processed similarly.

Figure 11:
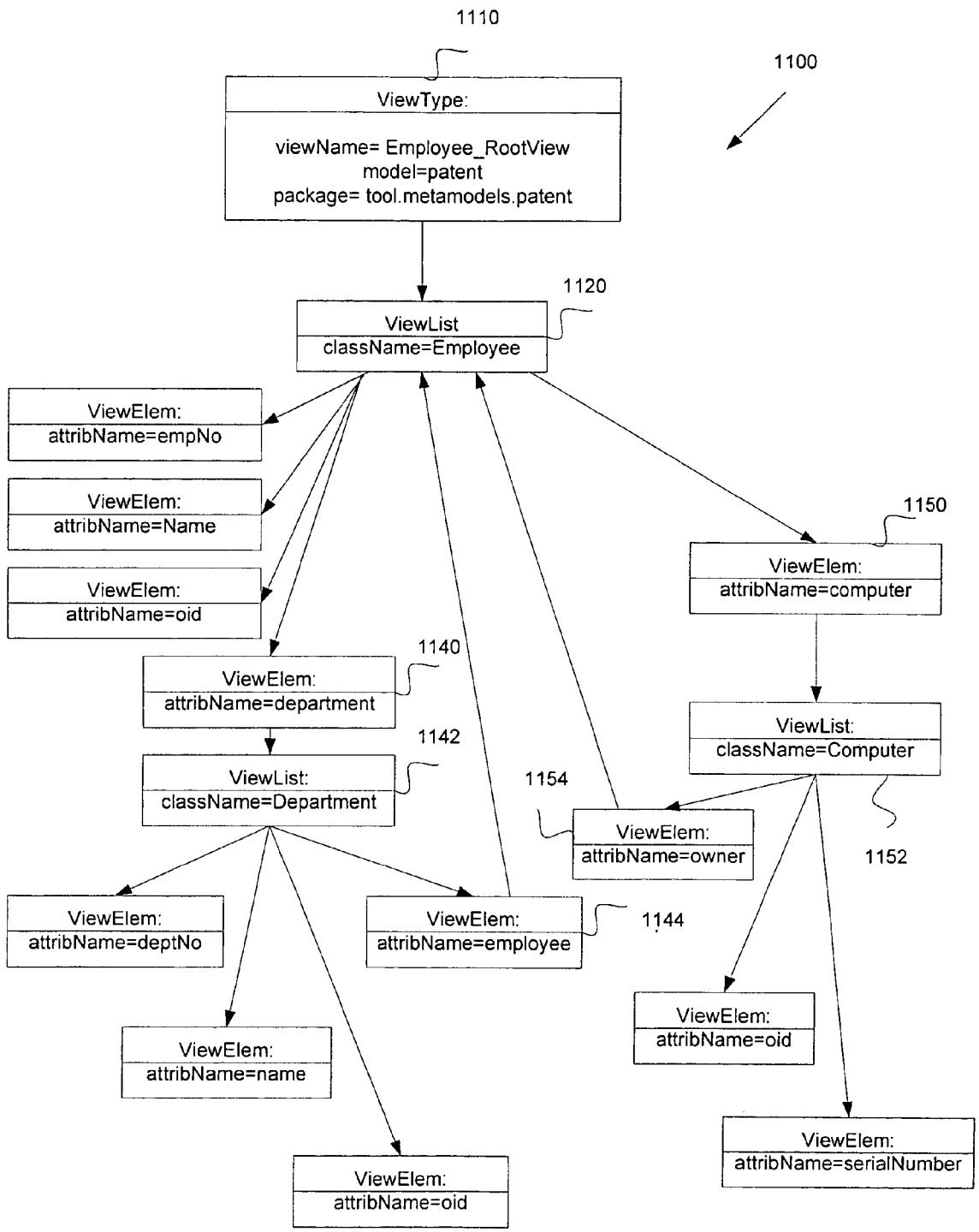
FIG. 11 illustrates a comprehensive ViewType for the Department_Employee base model in accordance with certain implementations of the invention.

Another feature of the automatically generated comprehensive ViewType is that it does not include redundant declarations of classes that might be required in more than one branch of the ViewType. Instead, the comprehensive ViewType uses existing declarations to form a networked ViewType. The comprehensive ViewType makes use of recursive structures to allow the comprehensive ViewType to be used with any configuration of instance data that adheres to the base model. Because most base models are actually networks as opposed to hierarchies, ViewTypes also can be networks in support of base models. FIG. 11 illustrates a comprehensive ViewType 1100 for the Department_Employee base model 300 rooted on the Employee class (330 in FIG. 3) and branching out to include the employee's computer and department in accordance with certain implementations of the invention.

ViewType 1100 includes a ViewType object 1110 that indicates the viewName attribute is Employee_RootView, the model attribute is patent, and the package is tool.metamodels.patent. The comprehensive ViewType 1100 also includes a root ViewList 1120 for the Employee class (330 in FIG. 3), a ViewList 1142 for the Department class (320 in FIG. 3), and a ViewList 1152 for the Computer class (340 in FIG. 3).

ViewList 1120 includes a ViewElem for each attribute of the Employee class 330. The ViewList 1120 also has a ViewElem 1140 that is connected to nested ViewList 1142 (corresponding to the Department class 320) and a ViewElem 1150 that is connected to a nested ViewList 1152 (corresponding to the Computer class 340). In the comprehensive ViewType 1100, the ViewList 1142 includes a ViewElem 1144 that is connected back to ViewList 1120. Also, the ViewList 1152 includes a ViewElem 1154 that is connected back to ViewList 1120.

The following Pseudocode B lists sample XMI for the comprehensive ViewType 1100 for the Department-Employee base model in accordance with certain implementations of the invention.

Types" that simplify the process of manipulating data by specifying those parts of an EMOF based model needed for a logical unit of work. Implementations of the invention allow a user to build and extend a ViewType from a user interface and

---

Pseudocode B

---

```
<xmi:XMI xmi:version="2.0" xmlns:xmi="http://www.omg.org/XMI"
xmlns:ViewType="ViewType.xmi">
    <ViewType:ViewType xmi:id="ViewType_1" viewName="Employee_VIEW"
model="patent" package="tool.metamodels.patent" ViewList="ViewList_1"/>
    <ViewType:ViewList xmi:id="ViewList_1" className="Employee" delete="true"
ViewType="ViewType_1" ViewElems="ViewElem_1 ViewElem_2 ViewElem_3
ViewElem_4 ViewElem_5" containingViewElem="ViewElem_6 ViewElem_7"/>
    <ViewType:ViewElem xmi:id="ViewElem_1" attribName="oid"
containingViewList="ViewList_1"/>
    <ViewType:ViewElem xmi:id="ViewElem_2" attribName="name"
containingViewList="ViewList_1"/>
    <ViewType:ViewElem xmi:id="ViewElem_3" attribName="empNo"
containingViewList="ViewList_1"/>
    <ViewType:ViewList xmi:id="ViewList_2" className="Department" delete="true"
ViewElems="ViewElem_8 ViewElem_9 ViewElem_10 ViewElem_6"
containingViewElem="ViewElem_4"/>
    <ViewType:ViewElem xmi:id="ViewElem_8" attribName="oid"
containingViewList="ViewList_2"/>
    <ViewType:ViewElem xmi:id="ViewElem_9" attribName="name"
containingViewList="ViewList_2"/>
    <ViewType:ViewElem xmi:id="ViewElem_10" attribName="deptNo"
containingViewList="ViewList_2"/>
    <ViewType:ViewElem xmi:id="ViewElem_6" attribName="employee"
containingViewList="ViewList_2" nestedViewList="ViewList_1"/>
    <ViewType:ViewElem xmi:id="ViewElem_4" attribName="department"
containingViewList="ViewList_1" nestedViewList="ViewList_2"/>
    <ViewType:ViewList xmi:id="ViewList_3" className="Computer" delete="true"
ViewElems="ViewElem_11 ViewElem_12 ViewElem_7"
containingViewElem="ViewElem_5"/>
    <ViewType:ViewElem xmi:id="ViewElem_11" attribName="oid"
containingViewList="ViewList_3"/>
    <ViewType:ViewElem xmi:id="ViewElem_12" attribName="serialNumber"
containingViewList="ViewList_3"/>
    <ViewType:ViewElem xmi:id="ViewElem_7" attribName="owner"
containingViewList="ViewList_3" nestedViewList="ViewList_1"/>
    <ViewType:ViewElem xmi:id="ViewElem_5" attribName="computer"
containingViewList="ViewList_1" nestedViewList="ViewList_3"/>
</xmi:XMI>
```

---

"ViewElem_6" for the "employee" attribute of "Department" points to the nestedViewList "ViewList_1" for "Employee". Also, "ViewElem_7" for the "owner" attribute of "Computer" nests the same "ViewList_1" for "Employee". Therefore, the ViewType object, "ViewList_1", for the "Employee" class appears once in the ViewType. This is how the comprehensive ViewType eliminates redundant declarations.

Because all the ViewType objects are complete, having all the attribute and association representations from the model class, they can be reused. The advantages of comprehensive ViewTypes are twofold. First, they can be much smaller than a fully expanded ViewType with the same information. Second, comprehensive ViewTypes are complete. If the user does not know exactly what subset of the model a unit of work will deal with, then a comprehensive ViewType may be used to process any configuration of instance data that adheres to the same model on which the ViewType is based. The ViewType generator 130 processes ViewTypes in such a way as to avoid infinite looping, although recursion is used.

In conclusion, implementations of the invention provide individualized views of a base model referred to as "View-allow for automatic generation of a comprehensive ViewType emanating from a specified base model class.

ADDITIONAL IMPLEMENTATION DETAILS

The described implementations may be implemented as a method, apparatus or article of manufacture using programming and/or engineering techniques to produce software, firmware, hardware, or any combination thereof. The term "article of manufacture" and "circuitry" as used herein refers to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which preferred implementations are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art. Additionally, the devices, adapters, etc., may be implemented in one or more integrated circuits on the adapter or on the motherboard.

The logic of FIGS. 4A and 4B describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 4A and 4B may be implemented in software, hardware, programmable and non-programmable gate array logic or in some combination of hardware, software, or gate array logic.

Figure 12:
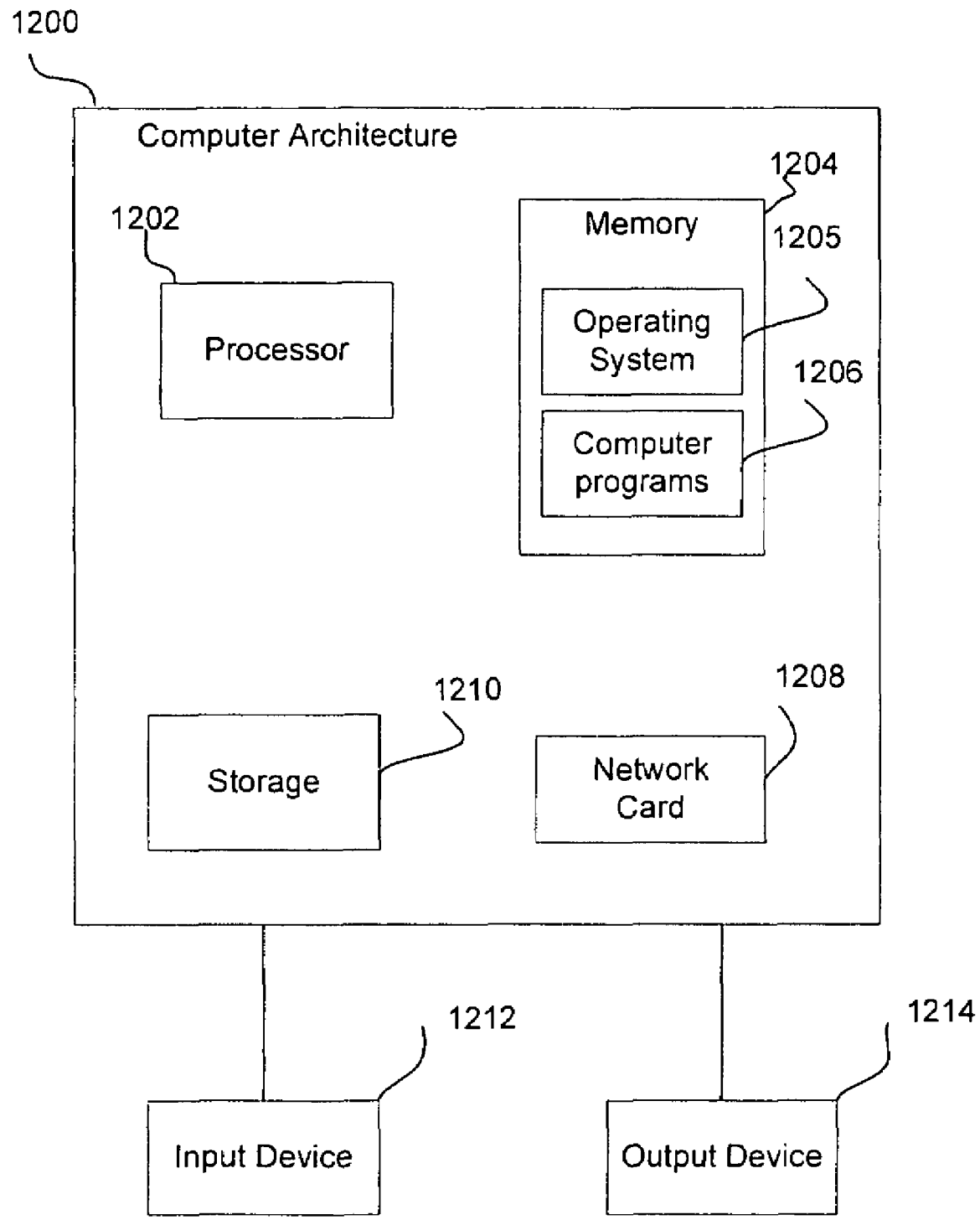
FIG. 12 illustrates an architecture of a computer system that may be used in accordance with certain implementations of the invention.

FIG. 12 illustrates an architecture of a computer system that may be used in accordance with certain implementations of the invention. Client computer 100, server computer 120, and/or operation console 180 may implement computer architecture 1200. The computer architecture 1200 may implement a processor 1202 (e.g., a microprocessor), a memory 1204 (e.g., a volatile memory device), and storage 1210 (e.g., a non-volatile storage area, such as magnetic disk drives, optical disk drives, a tape drive, etc.). An operating system 1205 may execute in memory 1204. The storage 1210 may comprise an internal storage device or an attached or network accessible storage. Computer programs 1206 in storage 1210 may be loaded into the memory 1204 and executed by the processor 1202 in a manner known in the art. The architecture further includes a network card 1208 to enable communication with a network. An input device 1212 is used to provide user input to the processor 1202, and may include a keyboard, mouse, pen-stylus, microphone, touch sensitive display screen, or any other activation or input mechanism known in the art. An output device 1214 is capable of rendering information transmitted from the processor 1202, or other component, such as a display monitor, printer, storage, etc. The computer architecture 1200 of the computer systems may include fewer components than illustrated, additional components not illustrated herein, or some combination of the components illustrated and additional components.

The computer architecture 1200 may comprise any computing device known in the art, such as a mainframe, server, personal computer, workstation, laptop, handheld computer, telephony device, network appliance, virtualization device, storage controller, etc. Any processor 1202 and operating system 1205 known in the art may be used.

The foregoing description of implementations of the invention has been presented for the purposes of illustration and description. It is not intended to be exhaustive or to limit the implementations of the invention to the precise form disclosed. Many modifications and variations are possible in light of the above teaching. It is intended that the scope of the implementations of the invention be limited not by this detailed description, but rather by the claims appended hereto. The above specification, examples and data provide a complete description of the manufacture and use of the composition of the implementations of the invention. Since many implementations of the invention can be made without departing from the spirit and scope of the implementations of the invention, the implementations of the invention reside in the claims hereinafter appended or any subsequently-filed claims, and their equivalents.

What is claimed is:

1. A method for processing a base model, comprising:
    displaying a user interface with an option of selecting an existing ViewType or creation of a new ViewType;
    in response to receiving selection of creation of the new ViewType,
        receiving selection of the base model, wherein the base model represents a set of classes, attributes of the classes, and associations between classes;
        traversing the base model to create a ViewType comprising a ViewType object, one or more ViewList objects corresponding to classes in the base model, and one or more ViewElem objects corresponding to attributes or associations in the base model, wherein the ViewType object has an association to at least one ViewList object, describes main attributes of the ViewType, and includes a model attribute that names the base model on which the ViewType is based, wherein each of the ViewList objects includes an attribute that names a base model class represented by that ViewList object and includes an association to a ViewElem object for each of the attributes and associations in the base model class that are defined in the ViewType, and wherein each of the ViewElem objects includes an attribute for a name of the attribute or association in the base model class represented by that ViewElem object; and
    building a tree type of structure with a root using the ViewType, wherein each node of the tree type of structure represents one of a ViewType instance for either the root of the ViewType or for a nested ViewType, a ViewList instance that maps to a class in the base model, or a ViewElem instance that maps to an attribute of a class in the base model;
    providing controls in the user interface for listing and selecting classes and attributes available for adding to the tree type of structure at a selected class or attribute;
    displaying the tree type of structure with the controls in the user interface;
    in response to selection of a class or attribute in the tree type of structure, providing additional information about the selected class or attribute in the user interface adjacent to the tree type of structure;
    receiving modifications to the tree type of structure via the controls in the user interface, wherein the modifications are selected from the group consisting of: adding, removing, and updating nodes in the tree type of structure;
    modifying the ViewType based on the modifications to the tree type of structure.

2. The method of claim 1, wherein the base model is represented by a file and wherein using the base model further comprises:
    parsing the file to generate the ViewType object, the one or more ViewList objects, and the one or more ViewElem objects.

3. The method of claim 1, further comprising:
displaying a list of the classes of the base model;
receiving from a user an indication of which class in the base model is to be a root class in the ViewType; and
generating the ViewType with that class as a root.

4. The method of claim 3, further comprising:
defining a ViewType class;
defining zero or more ViewList classes associated with the ViewType class; and
defining zero or more ViewElem classes associated with one of the ViewList classes.

5. The method of claim 1, wherein the ViewType created comprises a comprehensive ViewType based on a user specified root class, wherein the comprehensive ViewType includes all classes and attributes connected to the user specified root class.

6. The method of claim 1, further comprising:
saving the ViewType to a file.

7. The method of claim 6, further comprising:
receiving selection of the ViewType stored as a file;
converting the file to a ViewType; and
displaying the ViewType as a tree view in the user interface.

8. The method of claim 1, further comprising:
in response to receiving selection of an existing ViewType, displaying a list of existing ViewTypes;
receiving selection of a ViewType from the list; and
traversing a base model specified in the selected ViewType to create a ViewType object, one or more ViewList objects corresponding to classes in the base model, and one or more ViewElem objects corresponding to attributes or associations in the base model.

* * * * *